United States Patent [19]

MacCarthy, Sr.

[11] Patent Number: 4,640,687
[45] Date of Patent: Feb. 3, 1987

[54] IDLER PULLEY ADJUSTER

[76] Inventor: Donald W. MacCarthy, Sr., 11227 E. Rincon Dr., Whittier, Calif. 90606

[21] Appl. No.: 751,417

[22] Filed: Jul. 2, 1985

[51] Int. Cl.$^4$ .......................... F16H 7/08; B24B 21/00
[52] U.S. Cl. ........................................ 474/101; 51/148
[58] Field of Search ............... 474/101, 113, 119, 122, 474/123, 130, 133; 51/135-148

[56] References Cited

U.S. PATENT DOCUMENTS

| | | | |
|---|---|---|---|
| 2,449,519 | 9/1948 | Sutton | 51/148 |
| 2,706,367 | 4/1955 | MacCarthy | 51/148 |
| 3,127,712 | 4/1964 | Krogen et al. | 51/148 |
| 3,760,538 | 9/1973 | Solheim | 51/148 |
| 3,909,987 | 10/1975 | MacCarthy, Sr. | 474/133 X |

*Primary Examiner*—Stephen J. Novosad
*Assistant Examiner*—Thuy M. Bui
*Attorney, Agent, or Firm*—Jessup, Beecher & Slehofer

[57] ABSTRACT

An idler pulley adjustment mechanism for use with a sanding belt tightly wound on three co-planar pulleys includes a means for adjusting one of the pulleys in at least two axes. There is provided a vertical shaft secured to a hanger which is attached to a frame. Below the hanger is a tracking bracket secured to the shaft. The tracking bracket is adjustable by an offset threaded shaft for rotating the corresponding pulley shaft in one axis. A spring biases the tracking bracket relative to the upright frame. A second adjustable member is pivotally attached to the first adjustable member for providing adjustment of the pulley along a second axis perpendicular to the first axis. A set screw extending from the frame pivots the second adjustable member.

4 Claims, 3 Drawing Figures

IDLER PULLEY ADJUSTER

BACKGROUND AND SUMMARY OF THE INVENTION

This invention relates to devices for adjusting idler pulleys and more particularly to the devices for adjusting such pulleys used in the belt sanding machine.

This device is an improvement of the adjustment means disclosed in U.S. Pat. Nos. 2,706,367 and 3,909,987 and is particularly useful in machines having a sanding belt tightly wound on three co-planar pulleys. A frequent problem with sanders of these types is the slippage and loosening of the sanding belt due to misalignment of the pulleys. At times, if not corrected, the belt may even come off which could result in damage to a work piece or even injury. For this reason it is important that the belt be accurately centered on properly aligned pulleys during operation of the sander.

It was found that accurate centering of the belt was sensitive to alignment of the pulley. This knowledge resulted in the development of the invention described in U.S. Pat. No. 2,706,367. The adjustment device disclosed in that patent had provided a satisfactory solution to the adjustment problem. It was then realized that improvements in the adjusting mechanism could be made.

Part of the mechanism of U.S. Pat. No. 2,706,367 included a finger having an off-center boss engaging an arm. The adjustment was as simple as it could be, because the adjusting finger could make a complete revolution of 360 degrees. Also the snug fit of the boss and arm could easily bind by being clogged with the dust from the sander.

Since only slight adjustments of the idler puller were necessary, it was found that a flat adjustable arm using loose-fitting slots not only provided a much freer adjustment but also provided a convenient guide to limit the maximum adjustment. Also the device was easier to assemble and disassemble and has one less part. That improvement is disclosed in U.S. Pat. No. 3,909,987.

Since the previously mentioned patents, a new and third improvement means for the centering and adjusting the sanding belt has been found. The flat adjustable arm using loose fitting slots has been eliminated. Further, the square shoulder necessary with the first adjustment to maintain the orientation of the pulley shaft relative to the slot has also been eliminated. The new adjustment means rigidly secures the member with the square shoulder to a new tracking bracket placed below the hanger. The tracking bracket holds the shaft and prevents it from turning by securing it to the bracket by a screw. There are two adjustment means for this new method; one is a tracking knob having a shaft offset from the tracking bracket which in turn rotates the tracking bracket, and there is a spring towards the other end of the bracket for biasing the bracket. In-line and below the center of the tracking bracket is a set screw which adjusts the shaft and pulley and a second axis perpendicular to the first axis of adjustment.

Accordingly, it is an object of the present invention to provide an idler pulley adjustment device which has a tracking bracket biased on one end by a spring and pushed and rotatable by a tracking knob and threaded shaft.

Another object of the present invention is to provide an idler pulley adjustment mechanism having a set screw through the upright plane and providing adjustment of the lower or second adjustable member independently of the adjustment caused by the tracking knob and threaded shaft. These and other objects will become apparent when the description is considered in conjunction with the accompanying drawings.

DETAILED DESCRIPTION OF A PREFERRED EMBODIMENT

Figures 1, 2, 3:
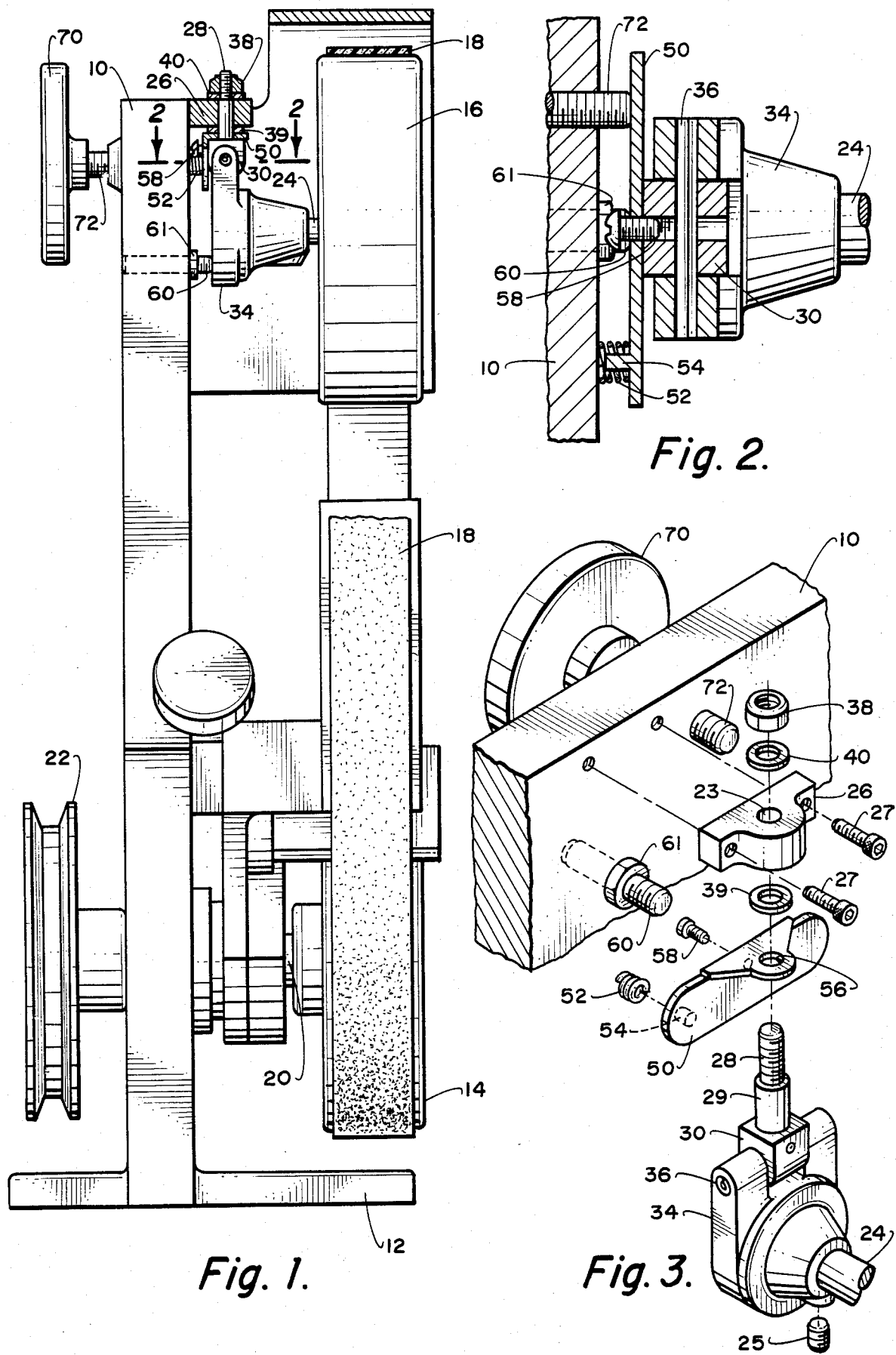
FIG. 1 is an end elevational view of a belt sander in partial section illustrating the use of the adjustment device.
FIG. 2 is a cross-sectional view of the adjustment device taken along the lines 2—2 of FIG. 1.
FIG. 3 is an exploded perspective view of the adjustment device as shown in FIGS. 1 and 2.

Referring to FIG. 1, a belt sanding machine is shown having an upright frame 10 and a base 12 for attachment to a workbench. The sander has a drive pulley 14 and may have two idler pulleys, one of which is shown at 16. The pulleys 14 and 16 are substantially co-planar, and are rotatably mounted on spaced horizontal axes. A sanding belt 18 is tightly wound on the pulleys 14 an 16. The drive pulley 14 is connected by a shaft 20 to a pulley 22 which is coupled to any suitable drive means such as an electrical motor.

In order to center and maintain belt 18 on the pulleys during operation of the sander, adjustment to one of the pulleys to assure proper alignment is necessary. Accordingly, means for adjusting idler pulley 16 is provided. The adjusting device provides adjustment of shaft 24 supporting pulley 16 by two axes.

The adjustment device is supported by a hanger 26 bolted to the frame 10 by means of two screws 27 having allenhead heads. The hanger 26 has a hole through which the shaft 28 of a first adjustable member 30 passes. A second adjustable member in the form of a pulley support 34 is rotatably attached to the first adjustable member 30 by pintle pin 36 passing through the two members. Shaft 24 is rigidly attached to pulley support 34 and idler pulley 16 is rotatably mounted by suitable roller or ball bearings not shown. Set screw 25 maintains the shaft 24 within the second adjustable member 34.

The first adjustable member 30 is secured on the hanger 26 by a nut 38 and washers 39 and 40 positioned on either side of the hanger 26. The first adjustable member includes a cylindrical bearing section 29 which snugly fits in the hole 56 of bracket 50 and hole 23 of the hanger. This cooperation allows the first adjustable member to be rotatable in the hole 23. There is a threaded shaft 28 on the first adjustable member extending above the hole 23 to which is attached the nut 38 and washer 40. The nut and washer prevent the first adjustable member from falling out of the hole 23. Below the hanger 26 is provided an elongate flat tracking bracket 50. The tracking bracket 50 is held in place by the first adjustable member 30. There is provided a securing screw 58 which passes through the tracking bracket and screws into the back of the first adjustable means 30 so that the first adjustable means 30 is rigidly secured to the tracking bracket 50. Offset to one side of the rear of the tracking bracket is a projection means illustrated as projection pin 54. Attached to this projection pin 54 is a spring biasing means 52 illustrated as a coil spring 52 which has a length longer than the projection pin 54. The spring maintains a tension between the upright frame 10 and one end of the tracking bracket 50. Passing through the upright frame 10 is a threaded shaft 72 which is attached at one end to a tracking knob 70. There is a threaded bore in the upright frame positioned generally horizontal with the projection pin 54 through which the threaded shaft passes. The threaded shaft of the tracking knob 70 extends from the frame and butts up against the backside of the tracking bracket offset from the first adjustable member. By rotating the tracking knob 70 the shaft moves in or out causing the first adjustable member 30 and the tracking bracket to rotate about the first axis provided by the first adjustable member 30. This in turn changes the axis of the shaft 24 relative to the belt 18. The spring 52 maintains tension or biasing on the tracking bracket so that if the tracking knob has to be rotated counterclockwise to change the axis of rotation of the pulley 16, then the spring will push the tracking bracket 50 away from the upright frame 10. By means of this tracking bracket and spring 52, the first axis of the shaft 24 can be adjusted. As previously stated, the shaft must rotate because the first adjustable member 30 is rigidly secured to the front of the tracking bracket 50. The nut 38 is maintained relative to the two washers 39 and 40 to allow reciprocal movement within the hole of the hanger 26. The hanger 26 is rigidly secured to the upright frame and does not move. That is, there is no adjustment means contained within the hanger 26 itself.

There is a set screw 60 having an allenhead or other suitable means at the one end to provide rotation of the screw towards or away from the backside of the second adjustable member 34. The set screw is threaded through a second bore in the upright frame 10. The bore is generally horizontal and oriented at the center of and below the tracking bracket 50. The set screw 60 is threaded through the second bore and butts up against the back of the second adjustable member 34. The set screw will move in or out by turning it. After adjustment, a locking nut 61, prevents the screw 60 from turning. The tension of the belt 18 on the pulley 16 keeps the second adjustable member pressing against the set screw 60. The turning of the set screw translates into adjustment of the second axis. Movement of the set screw in or out causes the pulley support 34 to rotate about the pintle pin 36. Both the set screw 60 and the threaded shaft of the tracking knob 70 are in a a tight enough fit with their respective bores that neither screw will change its adjustment without being changed by the operator of the belt grinding machine. The idler pulley 16 is in a third axis perpendicular to both the first and second axes. The sanding belt 18 is very sensitive to adjustment. The large tracking knob 70 translates to a fine adjustment of the first axis. The set screw 60 adjusts the second axis. The operator of the belt sanding machine can manipulate and fine tune the orientation of the idler pulley to correctly position the belt on the pulleys so that the belt is properly aligned and tracking correctly.

Obviously many modifications and variations will become apparent to those skilled in the art. Therefore, within the scope of the independent claims the invention may be practiced other than as specifically cited.

What is claimed is:

1. A device for adjusting an idler pulley comprising:
    an upright frame;
    a first adjustable member rotatably attached to said frame for adjustment about a first axis;
    a second adjustable member rotatably attached to said first member for adjustment about a second axis substantially perpendicular to the first axis;
    an idler pulley rotatably supported by said second member on a third axis substantially perpendicular to said first two axes;
    an elongate flat tracking bracket having a securing screw there through for engaging said first adjustable member to said tracking bracket, said tracking bracket having a projection means extending from its rear;
    spring means positioned between said main frame and said rear of said tracking bracket and engaging said projection means for biasing said tracking bracket away from said main frame;
    hanger means attached to said frame having a hole for holding said tracking bracket and said first adjustable means;
    tracking knob means having a threaded shaft for pivoting said tracking bracket and biasing it towards said main frame; and,
    screw means having its end projecting from said frame and positioned adjacent to said second adjustable member for pivoting said second adjustable member.

2. The device as recited in claim 1 wherein said shaft of said tracking knob means is positioned in a threaded bore in said upright frame, said bore being generally horizontal with said projection means and offset from said first adjustable member.

3. The device as recited in claim 2 wherein said first adjustable member includes a cylindrical bearing section terminating in a threaded shaft.

4. The device as recited in claim 3 wherein said bearing section cooperates with said hole in said hanger and is rotatable therein.

* * * * *